(12) United States Patent
Armstrong

(10) Patent No.: US 6,456,778 B2
(45) Date of Patent: *Sep. 24, 2002

(54) ANALOG CONTROLS HOUSED WITH ELECTRONIC DISPLAYS FOR VIDEO RECORDERS AND CAMERAS

(76) Inventor: Brad A. Armstrong, P.O. Box 2048, Carson City, NV (US) 89702

( * ) Notice: Subject to any disclaimer, the term of this patent is extended or adjusted under 35 U.S.C. 154(b) by 0 days.

This patent is subject to a terminal disclaimer.

(21) Appl. No.: 09/733,437

(22) Filed: Dec. 8, 2000

Related U.S. Application Data

(63) Continuation of application No. 09/568,662, filed on May 10, 2000.
(60) Provisional application No. 60/133,682, filed on May 11, 1999.

(51) Int. Cl.$^7$ ................................................ H04N 5/91
(52) U.S. Cl. ........................................................ 386/46
(58) Field of Search ................. 463/36, 37; 273/143 B; 345/156, 159; 200/513; 700/91, 92, 93; 369/30, 292; 386/46

(56) References Cited

U.S. PATENT DOCUMENTS

| | | |
|---|---|---|
| 2,430,284 A | 11/1947 | Evers |
| 3,611,068 A | 10/1971 | Fujita |
| 3,693,425 A | 9/1972 | Starita et al. |
| 3,771,037 A | 11/1973 | Bailey |
| 3,806,471 A | 4/1974 | Mitchell |
| 3,921,445 A | 11/1975 | Hill et al. |
| 3,952,173 A | 4/1976 | Tsuji |
| 3,988,556 A | 10/1976 | Hyodo |
| 4,099,409 A | 7/1978 | Edmond |
| 4,216,467 A | 8/1980 | Colston |
| 4,224,602 A | 9/1980 | Anderson |
| 4,246,452 A | 1/1981 | Chandler |
| 4,268,815 A | 5/1981 | Eventoff |
| 4,276,538 A | 6/1981 | Eventoff |

(List continued on next page.)

FOREIGN PATENT DOCUMENTS

| | | |
|---|---|---|
| DE | 3031484 | 11/1982 |
| DE | 3543890 | 6/1987 |
| DE | 3634912 | 4/1988 |

(List continued on next page.)

OTHER PUBLICATIONS

IBM Technical Disclosure Bulletin pp230–235 Feb. 1990 Mouse Ball–Actuating Device With Force And Tactile Feedback (generally all relavant).
Research Disclosure Nov. 1987 28373 Joystick with Tactile Feedback (generally all relevant).
S.F. Kambic, IBM Technical Disclosure Bulletin, vol. 20 No. 5 Oct. 1977 (generally all).
Questel–Orbit QWEB pp. 1–24 (submitted herewith) (generally all is relevant).

*Primary Examiner*—John Paradiso

(57) ABSTRACT

In an electronic device, a combination of an electronic visual display on a housing, electronic circuitry in the housing, the housing having at least one human user depressible surface with associated analog pressure-sensitive element for output of a signal of variable value utilized by the circuitry to control or manipulate one or more functions of the device. The at least one analog pressure-sensitive element receives pressure applied by a user's finger or thumb to the depressible surface, varied pressure applied by the user determines varied value of the signal. The resultant control manipulation from the analog variable value is in some. manner indicated, displayed or made visually detectable on the display at least at the time of manipulation so that the user receives visual feedback allowing termination, increase or decrease, if needed or desired, of finger pressure on the depressible surface of the analog sensor.

18 Claims, 7 Drawing Sheets

U.S. PATENT DOCUMENTS

| | | | |
|---|---|---|---|
| 4,297,542 A | 10/1981 | Shumway | |
| 4,301,337 A | 11/1981 | Eventoff | |
| 4,313,113 A | 1/1982 | Thronburg | |
| 4,314,228 A | 2/1982 | Eventoff | |
| 4,315,238 A | 2/1982 | Eventoff | |
| 4,348,142 A | 9/1982 | Figour | |
| 4,369,663 A | 1/1983 | Venturello et al. | |
| 4,414,537 A | 11/1983 | Grimes | |
| 4,469,330 A | 9/1984 | Asher | |
| 4,469,930 A | 9/1984 | Asher | |
| 4,536,746 A | 8/1985 | Gobeli | |
| 4,552,360 A | 11/1985 | Bromley | |
| 4,555,960 A | 12/1985 | King | |
| 4,615,252 A | 10/1986 | Asahi | |
| 4,670,743 A | 6/1987 | Zemke | |
| 4,673,919 A | 6/1987 | Kataoka | |
| 4,684,089 A | 8/1987 | van der Lely | |
| 4,694,231 A | 9/1987 | Alvite | |
| 4,733,214 A | 3/1988 | Andersen | |
| 4,786,895 A | 11/1988 | Castaneda | |
| 4,811,608 A | 3/1989 | Hilton | |
| 4,855,704 A | 8/1989 | Betz | |
| 4,866,542 A | 9/1989 | Shimada | |
| 4,910,503 A | 3/1990 | Broadsky | |
| 4,924,216 A | 5/1990 | Leung | |
| 4,933,670 A | 6/1990 | Wislocki | |
| 4,935,728 A | 6/1990 | Kley | |
| 4,975,676 A | 12/1990 | Greenhalgh | |
| 5,065,146 A | 11/1991 | Garrett | |
| 5,103,404 A | 4/1992 | McIntosh | |
| 5,128,671 A | 7/1992 | Thomas, Jr. | |
| 5,132,658 A | 7/1992 | Dauenhauer et al. | |
| 5,142,931 A | 9/1992 | Menahem | |
| 5,164,697 A | 11/1992 | Kramer | |
| 5,168,221 A | 12/1992 | Houston | |
| 5,189,355 A | 2/1993 | Larkins et al. | |
| 5,196,782 A | 3/1993 | D'aled et al. | |
| 5,200,597 A | 4/1993 | Eastman | |
| 5,203,563 A | 4/1993 | Loper | |
| 5,207,426 A | 5/1993 | Inoue | |
| 5,237,311 A | 8/1993 | Mailey et al. | |
| 5,252,952 A | 10/1993 | Frank et al. | |
| D342,740 S | 12/1993 | Parker | |
| 5,287,089 A | 2/1994 | Parsons | |
| 5,293,158 A | 3/1994 | Soma | |
| 5,298,919 A | 3/1994 | Chang | |
| 5,311,779 A | 5/1994 | Teruo | |
| 5,315,204 A | 5/1994 | Park | |
| 5,329,276 A | 7/1994 | Hirabayashi | |
| 5,355,352 A * | 10/1994 | Kobayashi et al. | 368/281 |
| 5,364,108 A | 11/1994 | Esnouf | |
| 5,365,494 A * | 11/1994 | Lynch | 368/10 |
| 5,376,913 A | 12/1994 | Pine | |
| D355,901 S | 2/1995 | Bradley | |
| 5,396,235 A | 3/1995 | Maeshima | |
| 5,440,237 A | 8/1995 | Brown | |
| 5,457,478 A | 10/1995 | Frank | |
| 5,510,812 A * | 4/1996 | Omara et al. | 345/161 |
| 5,550,339 A | 8/1996 | Haugh | |
| 5,565,891 A | 10/1996 | Armstrong | |
| 5,589,828 A | 12/1996 | Armstrong | |
| 5,640,566 A | 6/1997 | Victor | |
| 5,670,955 A | 9/1997 | Thorne | |
| 5,673,237 A * | 9/1997 | Blank | 368/10 |
| 5,675,329 A | 10/1997 | Barker | |
| 5,689,285 A * | 11/1997 | Asher | 345/161 |
| 5,764,219 A * | 6/1998 | Rutledge et al. | 345/159 |
| 5,778,404 A | 7/1998 | Capps | |
| 5,781,807 A * | 7/1998 | Glassgold et al. | 396/71 |
| 5,790,102 A | 8/1998 | Nassimi | |
| 5,847,305 A | 12/1998 | Yoshikawa | |
| 5,847,639 A | 12/1998 | Yaniger | |
| 5,854,624 A | 12/1998 | Grant | |
| 5,867,808 A | 2/1999 | Selker et al. | |
| 5,883,619 A | 3/1999 | Ho | |
| 5,889,236 A | 3/1999 | Gillespie | |
| 5,895,471 A | 4/1999 | King | |
| 5,898,359 A | 4/1999 | Ellis | |
| 5,910,798 A | 6/1999 | Kim | |
| 5,943,044 A | 8/1999 | Martinelli | |
| 5,948,066 A | 9/1999 | Whalen | |
| 5,974,238 A | 10/1999 | Chase | |
| 5,983,004 A * | 11/1999 | Shaw et al. | 395/200.57 |
| 5,995,026 A | 11/1999 | Sellers | |
| 5,999,084 A | 12/1999 | Armstrong | |
| 6,020,884 A | 2/2000 | MacNaughton | |
| 6,049,812 A | 4/2000 | Bertram | |
| 6,102,802 A | 8/2000 | Armstrong | |
| 6,118,979 A | 9/2000 | Powell | |
| 6,135,886 A | 10/2000 | Armstrong | |
| 6,157,935 A | 12/2000 | Tran | |
| 6,185,158 B1 | 2/2001 | Ito | |
| 6,198,473 B1 | 3/2001 | Armstrong | |
| 6,208,271 B1 | 3/2001 | Armstrong | |
| 6,222,525 B1 | 4/2001 | Armstrong | |

FOREIGN PATENT DOCUMENTS

| | | |
|---|---|---|
| DE | 4019211 | 1/1991 |
| DE | 4013227 | 5/1991 |
| DE | 19606408 | 8/1997 |
| EP | 0205726 | 12/1986 |
| EP | 0337458 | 10/1989 |
| EP | 0 470 615 A1 | 2/1992 |
| EP | 0470615 | 2/1992 |
| EP | 0579448 | 1/1994 |
| EP | 1080753 | 3/2001 |
| GB | 2058462 | 4/1981 |
| GB | 2113920 | 8/1983 |
| GB | 2205941 | 12/1988 |
| GB | 2233499 | 1/1991 |
| GB | 2240614 | 8/1991 |
| GB | 2267392 | 12/1993 |
| GB | 2308448 | 6/1997 |
| JP | 601 75401 | 9/1985 |
| JP | 62160623 | 7/1987 |
| JP | 02158105 | 6/1990 |
| JP | 03108701 | 5/1991 |
| JP | 04155707 | 5/1992 |
| JP | 5-87760 | 4/1993 |
| JP | 05151828 | 6/1993 |
| JP | 6154422 | 6/1994 |
| JP | 7281824 | 10/1995 |
| JP | 7-302159 | 11/1995 |
| JP | 09213168 | 8/1997 |
| JP | 9218737 | 8/1997 |
| JP | 09223607 | 8/1997 |
| JP | 11031606 | 2/1999 |
| RU | 2010369 | 3/1994 |
| SU | 739505 | 12/1977 |
| WO | wo 9532776 | 12/1995 |
| WO | WO9957630 | 11/1999 |

* cited by examiner

ANALOG CONTROLS HOUSED WITH ELECTRONIC DISPLAYS FOR VIDEO RECORDERS AND CAMERAS

CROSS-REFERENCE TO RELATED APPLICATIONS

A Priority claim is hereby made under 35 U.S.C. 120:

This application is a continuation of U.S. Non-Provisional patent application Ser. No. 09/568,662 filed May 10, 2000, and a Priority claim was made to Provisional Patent Application No. 60/133,682 filed May 11, 1999 in and for the Application No. 09/568,662.

BACKGROUND OF THE INVENTION

1. Field of the Invention

The present invention involves an electronic device including a combination of a electronic visual display in or on a housing, electronic circuitry in the housing, and at least one analog sensor comprising a finger or thumb depressible surface with associated analog pressure-sensitive element. The analog pressure-sensitive element is for output of a signal of variable value utilized by the circuitry to control or manipulate one or more functions of the electronic device. The resultant control manipulation from the analog sensor is in some manner indicated or displayed on the display at least at the time the user is pressing the depressible surface, thereby the human user is provided data related to a new state or setting brought about, or in the process of being brought about, by manipulating the variable value of the analog sensor through controlled varied amounts of finger pressure applied to the depressible surface of the analog sensor. Based upon the feedback on the display, the user may terminate, increase or decrease the finger pressure on the depressible surface of the analog sensor.

2. Brief Description of Related Prior Art

Displays, housings, electronics and analog output buttons do exist in the prior art. The present invention, however, does not exist in the prior art and is of significant and substantial value as will become fully appreciated with continued reading.

SUMMARY OF THE INVENTION

The present invention, at least from one viewpoint, is an electronic device, which may take many forms as herein disclosed, but all including a combination of a electronic visual display in or on a housing, electronic circuitry in the housing, and including at least one human user depressible surface with associated analog pressure-sensitive element for output of a signal of variable value utilized by the circuitry to control or manipulate a function(s) of the device. The at least one analog pressure-sensitive element receives pressure applied by a user's finger (the word finger or fingers or digit can be herein used to include the thumb) to the depressible surface, varied pressure applied by the user determines varied value of the signal, and this allows the user to select rates of change, the rate of change in some way being displayed on the display to allow the user to choose more or less pressure, or to terminate pressure on the finger depressible surface. The resultant control manipulation from the analog variable value is in some manner indicated or made visually detectable as feedback on the display at least at the time the analog sensor is being depressed, and this to allow the intelligent application of finger pressure by the user to the analog sensor. Some examples of functions which can be manipulated, controlled or changed, and at variable rates dependant upon user applied pressure, include menus or lists displayed on telephones, television program menus and the like, numeric settings such as related to time, temperature or number of units, such as number of copies to be made by a photocopy machine for example. Some additional examples of electronic devices described in accordance with the invention include desktop displays, hand-held game systems, personal digital assistants (PDA), electronic books, wireless web browsers, time display clocks/watches, cooking ovens, pagers, remote controller such as used with TVs stereos, etc., and coffee makers all with displays. The displays can be CRT, non-CRT, LCD, LED or any other suitable type and in many applications are seven-element numeric displays such as are commonly used to display number of units or time.

An object of the present invention is to provide an electronic device including a combination of an electronic visual display in or on a housing, electronic circuitry in the housing, and at least one analog sensor comprising a finger or thumb depressible surface with associated analog pressure-sensitive element for output of a signal of variable value utilized by the circuitry to manipulate one or more functions of the electronic device at varied rates, the manipulation in some manner indicated on the display at least at the time the user is pressing the depressible surface, thereby the human user is provided data allowing the intelligent increase, decrease or termination of the finger pressure to effect a rate of change.

DETAILED DESCRIPTION OF THE INVENTION

Figure 1:
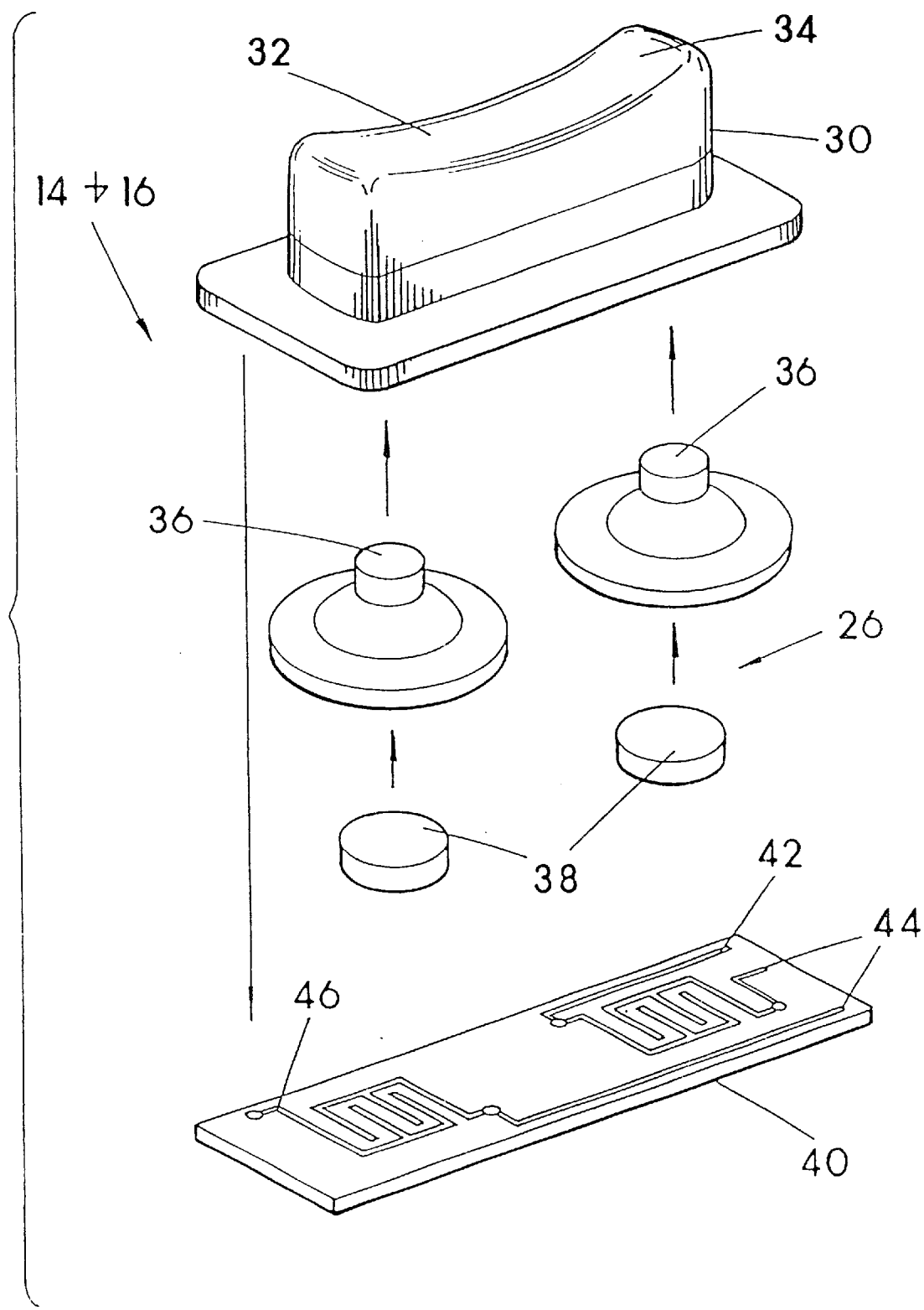
FIG. 1 shows an exploded view of a 2-way analog rocker as may be employed with the invention.

Herein incorporated by reference is my pending U.S. Provisional application 60/133,682 filed May 11, 1999 titled ANALOG CONTROLS HOUSED WITH ELECTRONIC DISPLAYS for the teachings of the present invention therein.

Also herein incorporated by reference is my pending U.S. Non-Provisional application Ser. No. 08/942,450 filed Oct. 1, 1997, title GAME CONTROLLER WITH ANALOG PRESSURE SENSOR(S), now U.S. Pat. No. 6,102,802; this disclosure incorporated by reference primarily for the positive teachings therein of structuring and methods of use and the reading of analog sensors such as elastomeric dome-cap style positioned in end-use for depression directly or in-directly by a human digit with varying degrees of force. Additionally, 4-way analog rockers, 2-way analog rocker buttons and individual analog push buttons are described in detail in my disclosure titled GAME CONTROLLER WITH ANALOG PRESSURE SENSOR(S).

Also herein incorporated by reference is my pending U.S. Non-Provisional application 09/122,269 filed Jul. 24, 1998, titled VARIABLE-CONDUCTANCE SENSOR WITH ELASTOMERIC DOME-CAP, now U.S. Pat. Ser. No. 6,135,886; this disclosure incorporated by reference primarily for the positive teachings therein of structuring and methods of use and the reading of analog sensors such as elastomeric dome-cap sensors positioned in end-use for depression directly or in directly by a human digit with varying degrees of force, and for data related to possible digital bit assigning to various states or levels of conductivity of the analog sensors wherein the differing bit assignment can be used indicative of differing pressures applied by the human user to the analog or pressure-sensitive variable-conductance sensor(s).

Also herein incorporated by reference is my U.S. Pat. No. 5,999,084 issued Dec. 7, 1999 titled VARIABLE-CONDUCTANCE SENSOR; this Patent incorporated by reference primarily for the positive teachings therein of structuring and methods of use and the reading of analog sensors as with my packaged type such as with a conductive dome providing a tactile feedback, circuit elements and pressure-sensitive variable-conductance material engaged or engagable with the circuit elements to provide analog output or the like; the sensor positioned in end-use for depression directly or in-directly such as by a human digit with varying degrees of force. This sensor provides tactile feedback at approximate activation and deactivation of the analog pressure sensitive material, the disclosure describing the benefits, which can be gained with an analog sensor providing bi- or uni-directional tactile feedback.

Also herein incorporated by reference is my pending U.S. Provisional application 60/135,085 filed May 20, 1999 titled KEYBOARD WITH DEPRESSIBLE ANALOG SCROLL CONTROL. This provisional disclosure also includes a modified USB software code on 3.5" floppy which although specifically directed to my Mouse With Analog Buttons of application Ser. No. 09/167,314, it can clearly be readily modified to operate with the present invention, although those skilled in the art will agree numerous suitable software codes can be readily applied with little modification to interface between the hardware of a keyboard in accordance with the invention and software, ROM, hardware, etc. of a computer to be manipulated by the present keyboard. The modified code is one which includes a bit assignment for each scroll direction and associated with each button associated with that direction, and which is arranged along with electronics to repeat the direction-identifying code at a variable rate of repeat when the user is depressing the associated button, the rate of repeat (scrolling) indicative of the read value of the analog sensor, i.e., pressure-sensitive variable-conductance material and the amount of depressive force the human user is applying thereto. Greater details of this Variable-Rate On/Off Messaging System are provided in my pending U.S. Provisional application filed May 10, 1999, application No. 60/133,319 and herein incorporated by reference, and this for the teaching of the varied "ON" or "OFF" signal rate of sending, the rate of the simple message being dependent or resultant of the amount of pressure applied or the varied value single of a pressure-sensitive analog element. Certainly other suitable codes and the like can be utilized within the scope of the invention. For more data regarding software or firmware codes, go to cypress.com on the World Wide Web. Also incorporated herein is my pending U.S. Non-Provisional application version of the Provisional application Ser. No. 60/135,085 filed May 20, 1999 titled KEYBOARD WITH DEPRESSIBLE ANALOG SCROLL CONTROL, the Non-Provisional application Ser. No. 9/563,109 filed May 2, 2000 also titled KEYBOARD WITH DEPRESSIBLE ANALOG SCROLL CONTROL.

Also herein incorporated by-reference is my pending U.S. Non-Provisional application No. 08/677,378 filed Jul. 5, 1996 titled IMAGE CONTROLLERS AND SENSORS (as amended) particularly, but not exclusively, for the pressure-sensitive membrane analog sensors with tactile feedback described therein.

Also herein incorporated by reference is my pending U.S. Non-Provisional application 09/148,806 filed Sep. 4, 1998, title REMOTE CONTROLLER WITH ANALOG BUTTON(S). This disclosure incorporated by reference primarily for the positive teachings therein of structuring and methods for dual-purpose sensors capable of both analog and On/Off modes.

Also herein incorporated by reference is U.S. Pat. No. 4,314,227 issued Feb. 2, 1982, this patent incorporated only for its positive teachings of membrane or sheet based analog sensors.

With reference now to the drawings for a more detailed description.

Figure 3:
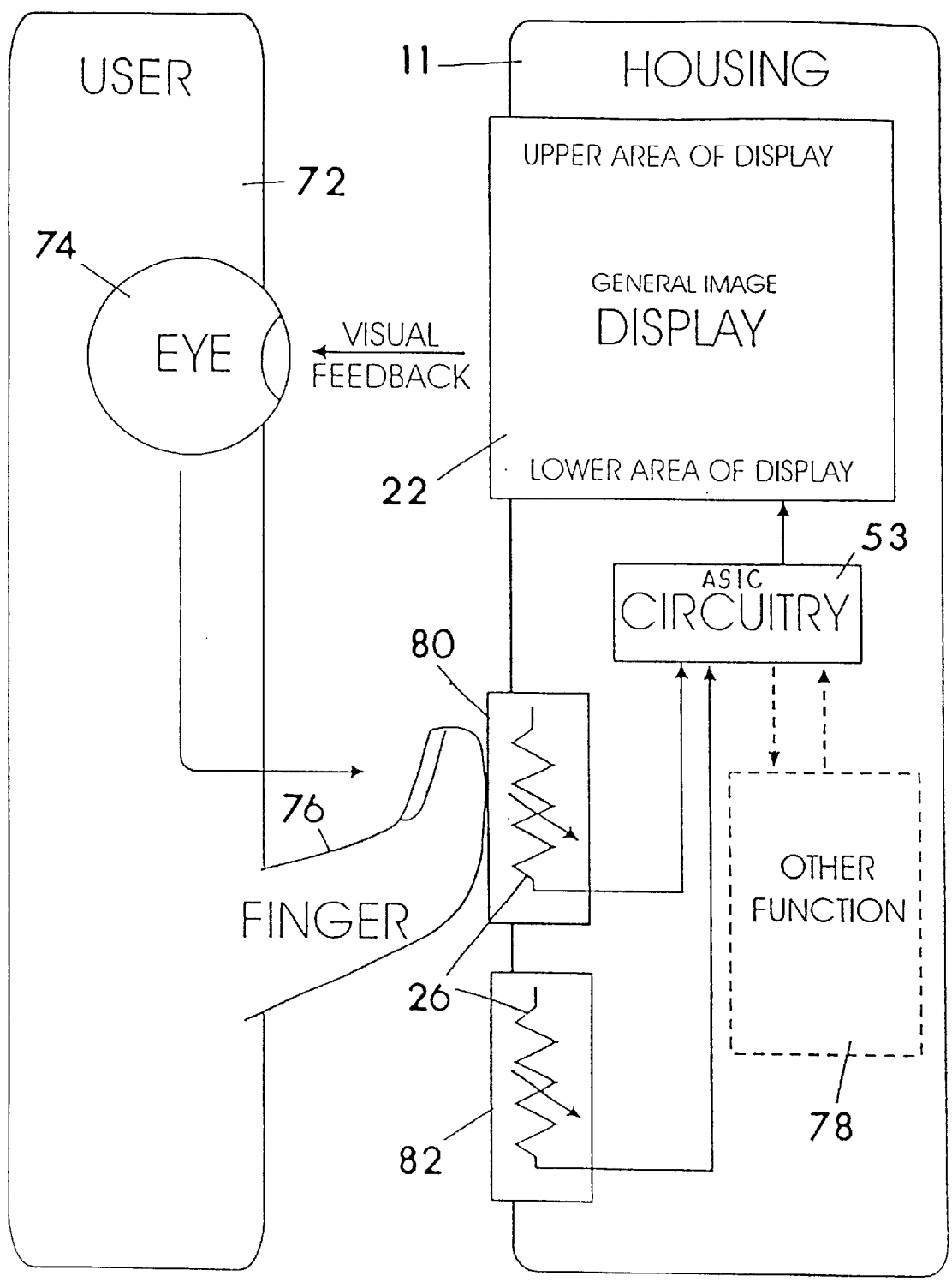
FIG. 3 shows a block diagram in accordance with the invention having a general image display.
Figure 4:
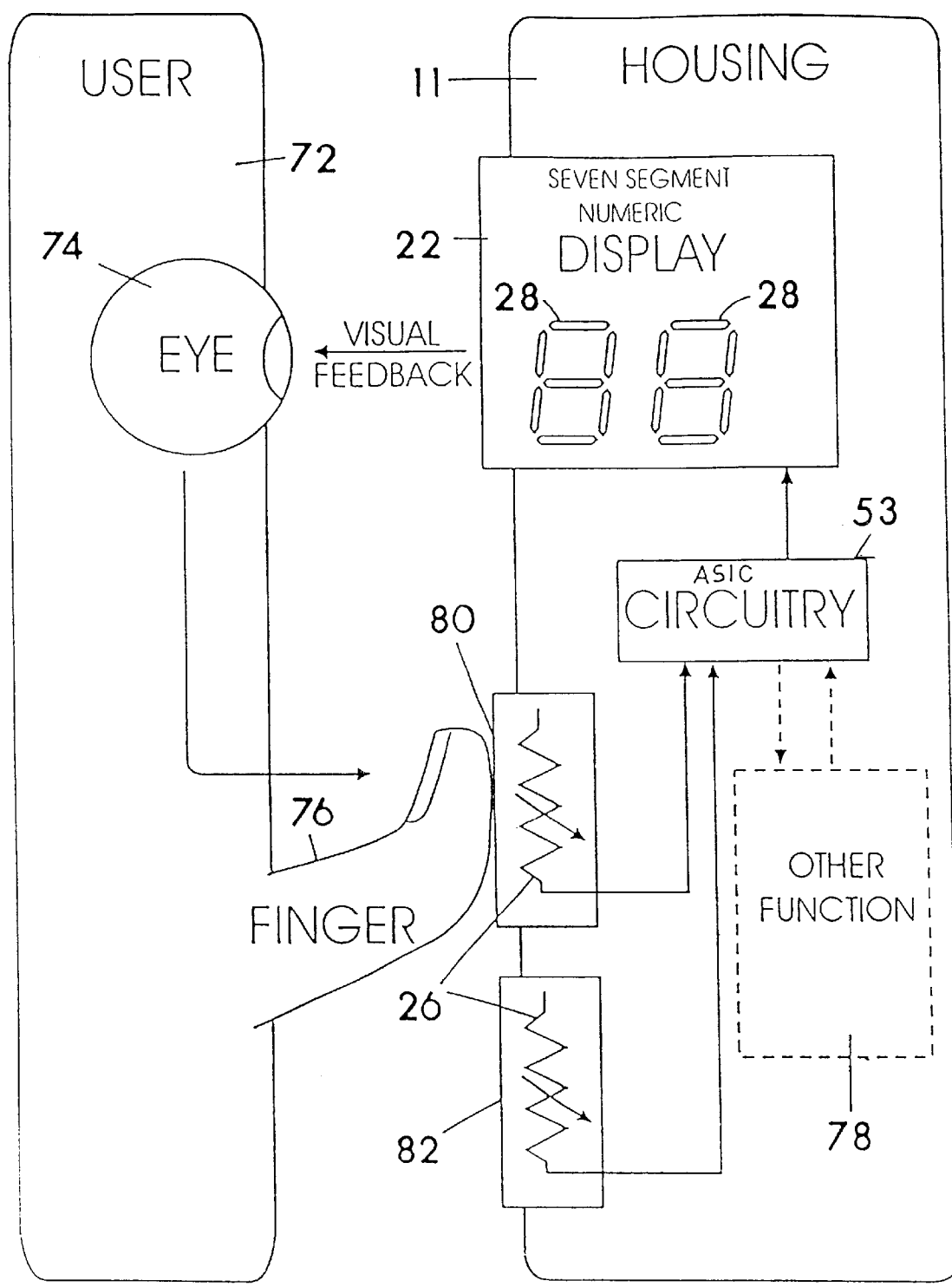
FIG. 4 shows a block diagram in accordance with the invention having a two digit seven segment numeric display.
Figure 5:
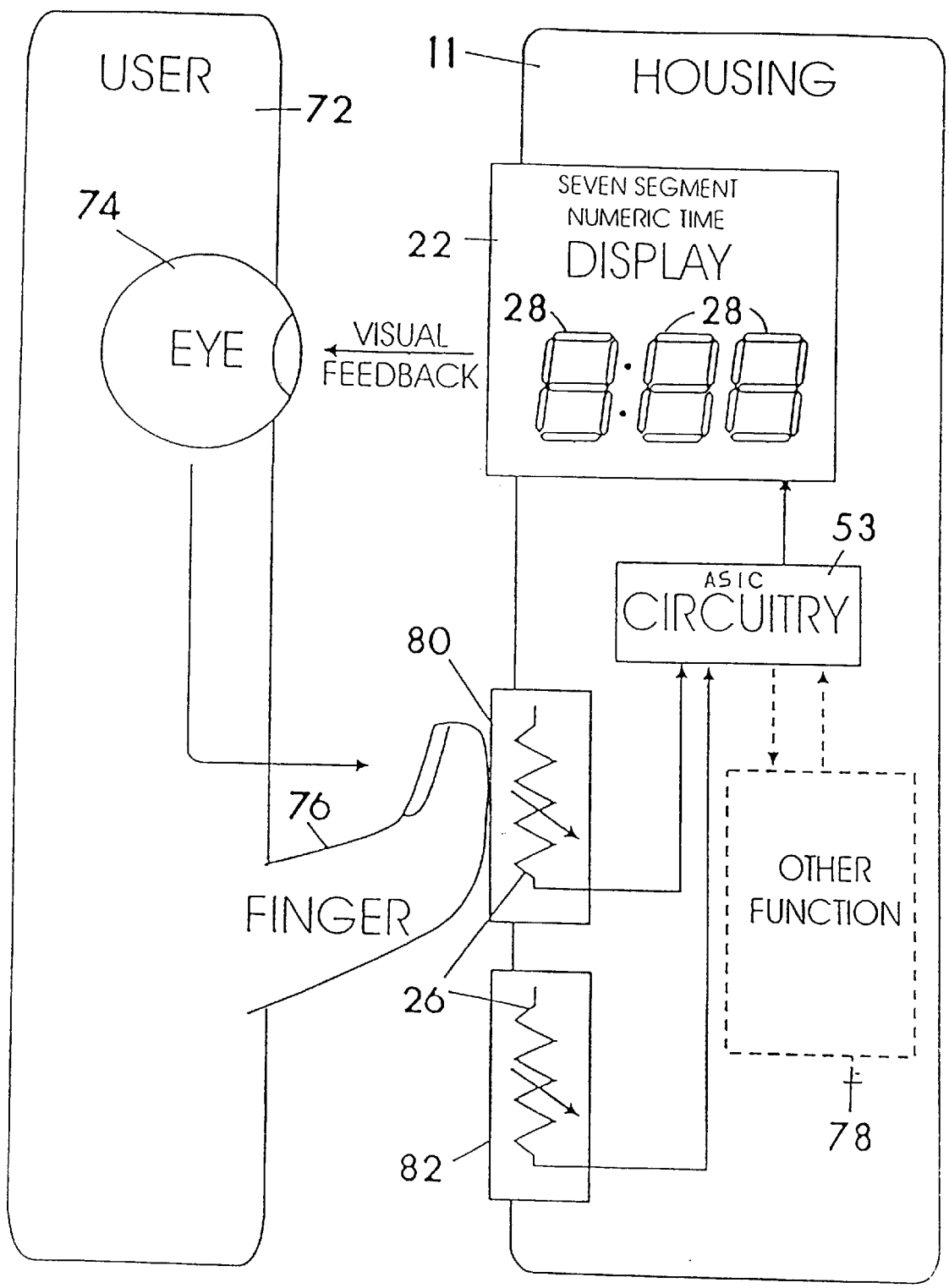
FIG. 5 shows a block diagram in accordance with the invention having a three digit seven segment numeric time display.

FIGS. 3–5 show various diagrams of general image displays that may be utilized with a variety of consumer electronic devices, such as a desktop display, in accordance with the invention and having a housing 11, a display 22 associated with housing 11, i.e. mounted on or in the housing 11, and at least one analog sensor 26 having a depressible surface area associated with the display. Analog sensors 26 can be ganged in 2-way and 4-way units such as rockers 14, 16 and 18, or can be in single button or surface form such as shown at 19 in some of the drawings. The analog sensor 26 in a preferred structure has a pressure-sensitive variable-conductance material for providing a variable signal varying with differing amounts of user finger applied pressure, however, the associated circuitry can be structured to additionally read a rapid press and release on the sensor as a momentary-On used to supply a single increment signal, e.g., single step numeric increase/decrease or scroll up/down. As the user's finger depresses the sensor material, its conductivity is read by associated circuitry, such as a microcontroller, reading the time of charge or discharge of a capacitor as determined by the conductivity of the analog sensor material. The devices that may be utilized with the present invention already have internal microcontrollers or even more complex circuitry, and one of average skill in the art can readily apply the analog buttons/sensors/analog rockers/analog membrane sensors to the indicated art with an understanding of this disclosure.

FIG. 1 shows an exploded view of a 2-way analog rocker 14 or 16 as may be employed in embodiments of the invention as an analog sensor 26. Shown is a circuit board 40 with exposed interdigitated circuit traces 44 as a common, 42, 46 as outs or switch legs; two "pills" or disks of pressure-sensitive variable-conductance material 38; two rubber-dome caps 36 positioned beneath a 2-way rocker member 30. The 2-way rocker member 30 has a first depressible surface 32 and a second depressible surface 34. Each finger depressible surface 32, 34 for functioning by depression with the shown respective dome-caps 36, pills 38 and the circuit traces 42, 44, 46. It does not require a rocker to electrically achieve that which is accomplished with a 2-way or 4-way, 14, 16, 18 rocker, as two separate or four separate depressible buttons or surfaces (see FIG. 2) can be used although I prefer the rocker format for ease of locating desired direction oriented depressible surfaces simply by feel without having to look.

Figure 2:
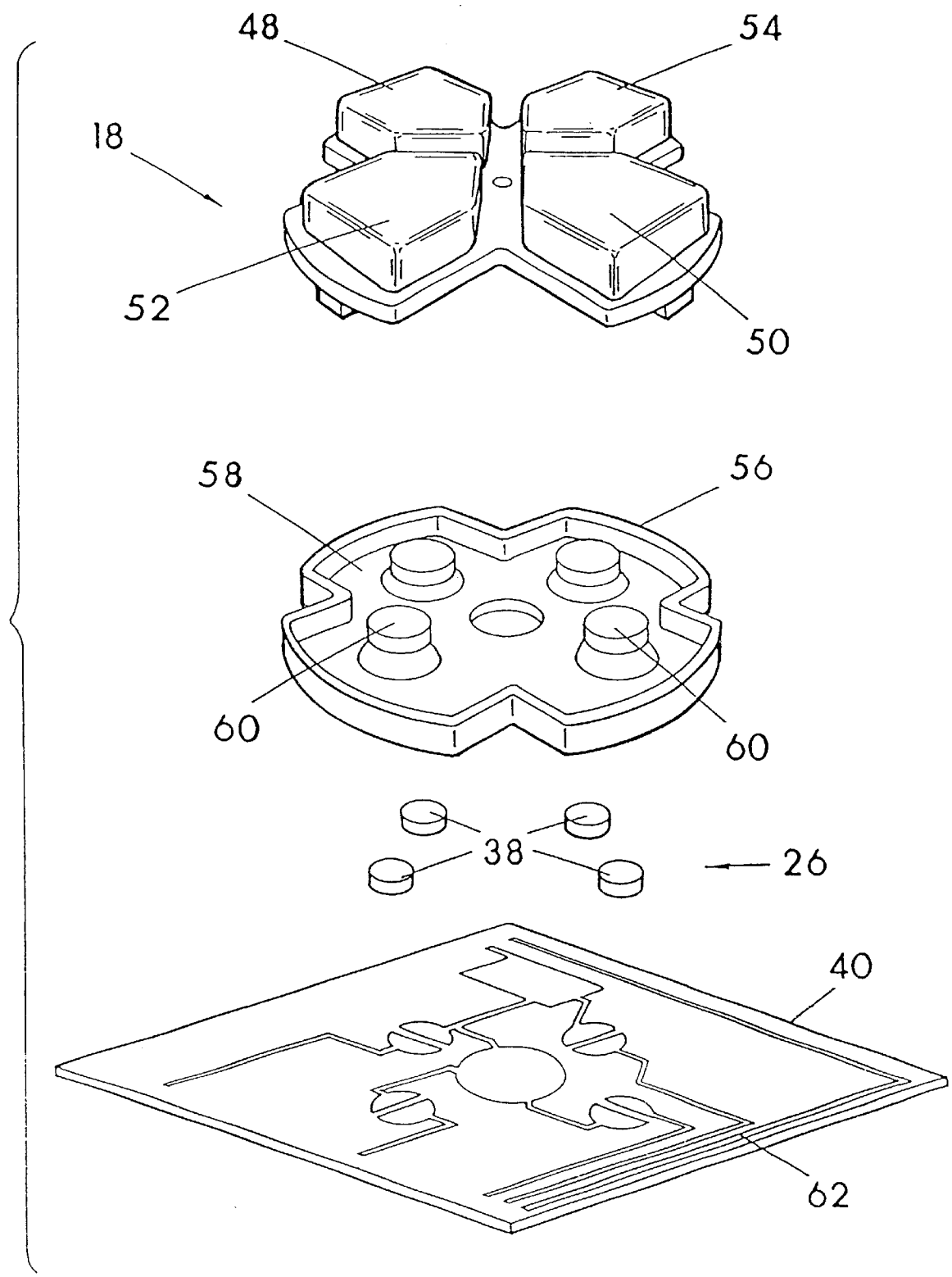
FIG. 2 shows an exploded view of a 4-way analog rocker as may be employed with the invention.

FIG. 2 shows an exploded view of a 4-way analog rocker 18 as may be employed in the embodiments of the current invention. Shown is a circuit board 40 with exposed circuit traces indicated at 62 for four sensors 26. Also shown are four pressure-sensitive variable-conductance pills or elements 38; a 4-way rubber-dome cap unit 56 with each of the 4 dome caps 60 support by base 58 over a "pill" or disk of pressure-sensitive variable-conductance material 38; and a 4-way rocker member having a first surface 48, a second surface 50, and third surface 52, and a fourth depressible surface 54. Each surface for functioning by depression with the shown respective dome-caps 60, pills 38 and circuitry 62 of the board 40. This disclosure discloses that which can be viewed from numerous points, but clearly herein described are improved methods, structures, and also methods of manufacturing in accordance with the present invention.

FIGS. 3–5 show block diagrams in accordance with the invention. Illustrated is a housing 11 containing two sensors 26, one sensor 26 having depressible surface 80 and the other sensor 26 having depressible surface 82. The sensors 26 are connected to circuitry 53 connected to a display 22. Also illustrated is a box representing a human user 72 with the user's eye 74 receiving visual feedback from display 22. The visual feedback received by the eye 74 at least in part influences the depressive pressure exerted by the user's finger 76 against sensor 26 which in turn is read by circuitry 53 which controls the visual feedback displayed on display 22, thus a closed loop feedback system is established in which the user 72 receives immediate feedback concerning the control of the electronic device according to the invention. The state of circuitry 53, as controlled by the user, can control other functions 78 of the electronic device.

FIG. 3 shows display 22 as a general image display. The general image display 22 of includes an upper area and a lower area, thus a user may scroll data at varying rates from the lower area to the upper area by pressing surface 80, and from the upper area to the lower area by pressing surface 82.

FIG. 4 shows display 22 having two seven segment numeric displays 28, thus the user may select numbers at a variable rate by varying depression on sensors 26. For example, such selection may be for number of copies to be made by a photocopy machine, temperature setting of a thermostat, channel number on a television and the like. Depression of surface 80 is arranged in this example to cause a variable rate of ascending numbers according to the level of depressive pressure applied to surface 80. Depression of surface 82 is arranged in this example to cause a variable rate of descending numbers according to the level of depressive pressure applied to surface 82.

FIG. 5 shows display 22 having three seven segment numeric displays 28 as are commonly used in time displays. Thus the user may select at a variable rate, numbers representing timing, by varying depression on sensors 26. In FIG. 5, depression of surface 80 is arranged in this example to cause a variable rate of ascending numbers representing time according to the level of depressive pressure applied to surface 80, and depression of surface 82 is arranged in this example to cause a variable rate of descending numbers according to the level of depressive pressure applied to surface 82, or surfaces 80 and 82 can be arranged to control hours and minutes individually. Clearly a clock can be greatly advantaged by ascending and descending sensors 26 for both hours and minutes adjustments.

Figure 6:
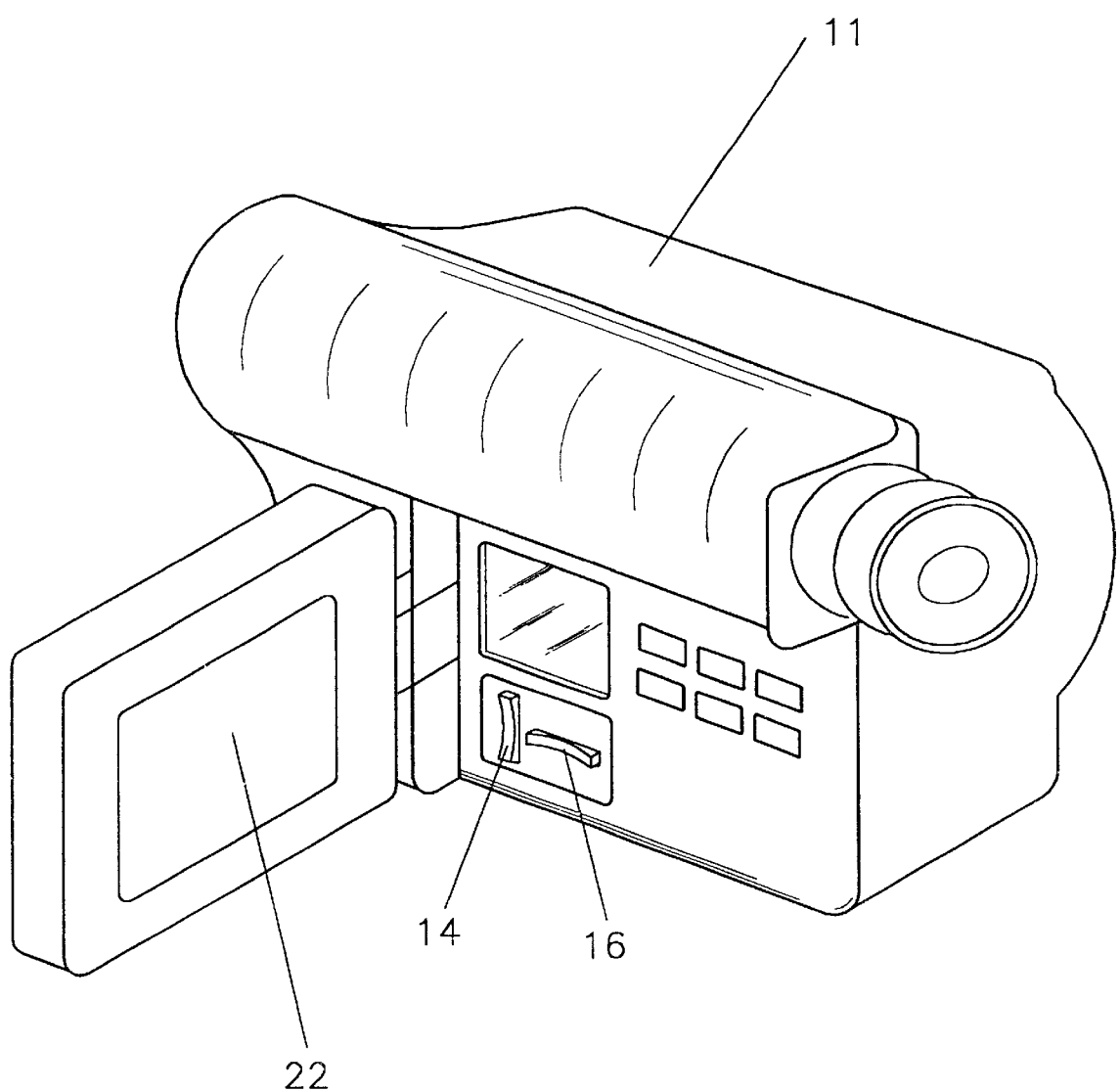
FIG. 6 shows a video recorder in accordance with the invention having a housing, an electronic display and two 2-way analog rocker buttons 14 and 16.

FIG. 6 shows a video recorder having a housing 11 and a display 22 mounted within housing 11. The display 22 can be any suitable display preferably a Non-CRT display. U.S. Class 345 contains many prior art patents describing Non-CRT displays for those wishing more information thereon. At the lower center portion of the housing are shown two 2-way analog rockers 14 and 16. Shown at the lower left center of housing 11 is a 2-way analog rocker 16 which can serve as an X-axis or horizontal control or scroller, and at the lower right center of housing 11 is shown a 2-way analog rocker 14 which can serve as a Y-axis or vertical control or scroller. The rocker depressible surfaces operate analog sensors 26 or from another view form components thereof. For example, the 2-way analog rocker 16 maybe utilized to scroll at variable speed through the digital images recorded enabling the viewer to view the images at a desired rate of speed. Correspondingly, the 2-way analog rocker 14 may be utilized to scroll through at variable speed the control commands appearing on the electronic display to modify the digital images stored in memory or to adjust the digital cameras functions for recording of future images, such as for example shutter speed and aperture opening.

Figure 7:
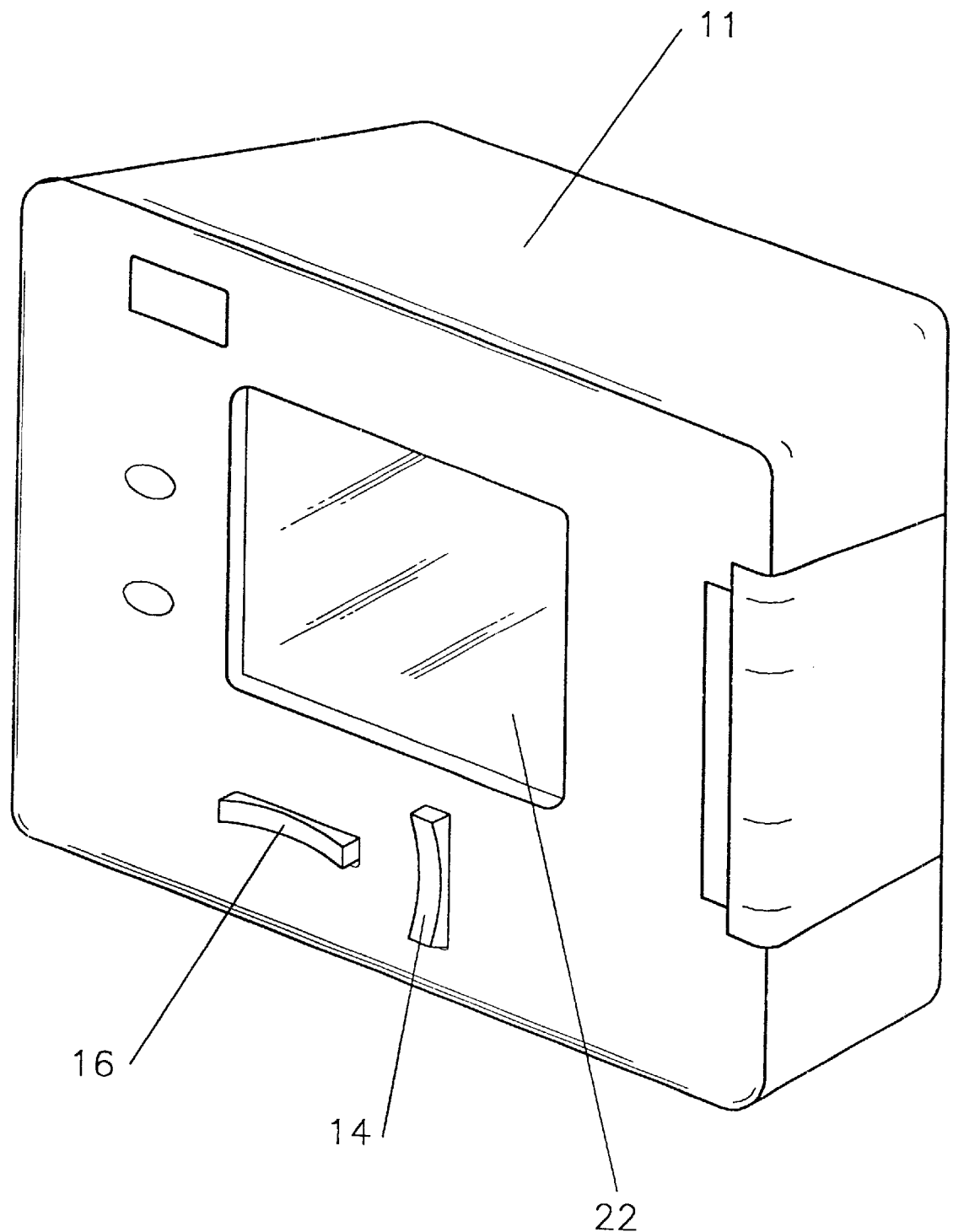
FIG. 7 shows a digital camera in accordance with the invention having a housing, an electronic display and two 2-way analog rocker buttons 14 and 16.

FIG. 7 shows a digital camera having a housing 11 and a display 22 mounted within housing 11. The display 22 can be any suitable display preferably a Non-CRT display. U.S. Class 345 contains many prior art patents describing Non-CRT display for those wishing more information thereon. U.S. Class 396 contains many prior art patents describing cameras for those wishing more information thereon. At the lower center back side of the camera housing are shown two 2-way analog rockers 14 and 16. Shown at the lower left center of housing 11 is a 2-way analog rocker 16 which can serve as an X-axis or horizontal control or scroller, and at the lower right center of housing 11 is shown a 2-way analog rocker 14 which can serve as a Y-axis or vertical control or scroller. The rocker depressible surfaces operate analog sensors 26 or from another view form components thereof. For example, the 2-way analog rocker 16 maybe utilized to scroll at variable speed through the video images recorded enabling the viewer to view the images at a desired rate of speed. Correspondingly, the 2-way analog rocker 14 may be utilized to scroll through at variable speed the control commands appearing on the electronic display to modify or adjust the recording of future video images. Alternatively, the 2-way analog rocker 16 maybe utilized to scroll at variable speed through the digital images recorded enabling the viewer to view the images at a desired rate of speed. Correspondingly, the 2-way analog rocker may be utilized to control the rate of speed at which the video recorder zooms in on or away from subject matter being recorded. In addition, it may also be utilized as a slow motion variable speed control for viewing the recorded video images. Further two 2-way analog rockers or one 4-way analog rocker may be utilized to scroll along the x-axis and y-axis of a recorded image to locate, mark, identify, enhance, enlarge or modify that particular location in the recorded image.

For all embodiments shown herein, the 4-way analog rockers 18 can each also serve as X-axis or horizontal control, and as Y-axis or vertical control or scroller manipulated by the user's thumb and or fingers (digits). It is anticipated that the 4-way analog rocker serves largely the same purposes as two perpendicular 2-way analog rockers, and while the embodiments shown herein demonstrate both 2-way and 4-way rockers, for most purposes an embodiment will need only one 4-way rocker or one or more 2-way rockers, or an equivalent number of single analog push buttons.

The present electronic devices utilize analog sensors and circuitry for reading at least three readable states, analog values or conductance levels of each of the analog sensors; the states, values, levels or the like may be or can be varied voltages or currents (example only), and are varied dependant upon depressive pressure applied to a finger depressible button associated with each analog sensor. Button may be herein treated as the finger depressible area of a rocker member such as a 2-way or 4-way or the like. The associated circuitry is structured to read an immediate, instant or current state or value of the analog sensors and to communicate representative control signals. The at least three states of the active element (analog sensor) can represent at least: 1) no pressure, 2) low pressure, and 3) high pressure applied to the depressible surface by the human user's finger or thumb (digit), the 3 level equating to rates of change. The analog sensor and circuitry arrangement can be employed in a manner wherein not just three but many states are read, thus ensuring high resolution reading of a variably changing depressive button pressure input. Preferably, many different user determinable rates (many different states rate by the circuitry) are provided between low and high pressure on the associated button so that the user is provided, for example, very slow, slow, medium, fast and very fast change rates. With the analog sensors, the user is provided variable change rate control dependant upon the degree of depressive pressure he or she applies to the button associated with the analog sensor(s) which is indicated or made visually detectable on the display at least at the time the analog sensor is being depressed, and this to allow the intelligent application of finger pressure by the user to the analog sensor. Based on the information shown on the associated display, the user can choose to increase, decrease or terminate finger pressure on the analog sensor. Such an arrangement provides the user vastly improved control by allowing the user to apply low pressure to have a slow rate of change, or to apply high pressure to initiate very rapid change, and then to reduce the applied pressure to the button to reduce the rate of change in order to stop easily and precisely on a desired target or within a desired area, such precise control is clearly advantageous and desirable.

The invention can be viewed or defined in numerous ways including structure and methods as those skilled in the art will realize upon a reading of this disclosure presented to exemplify rather than limit the invention. Thus, the invention should be defined by the broadest possible interpretation of the claims.

I claim:

1. A video recorder for recording imagery, comprising:
    a housing;
    electronic circuitry located in said housing;
    a general image display operatively connected to said circuitry;
    a first finger depressible surface in part exposed on said housing, said first finger depressible surface operatively connected to
    a pressure-sensitive first analog sensor, said first analog sensor for inputting a first signal to said circuitry;
    a second depressible surface in part exposed on said housing, said second depressible surface operatively connected to
    a pressure-sensitive second analog sensor, said second analog sensor for inputting a second signal to said circuitry;
    said circuitry structured to receive the signals and to cause said general image display to move displayed imagery at a variable rate according to variable pressure applied to the depressible surfaces.

2. A video recorder according to claim 1 wherein variable depression of a surface of a rocker having at least two depressible surfaces causes the imagery to zoom at a variable rate on said display.

3. A video recorder according to claim 1 wherein said first finger depressible surface and said second depressible surface are finger depressible single individual buttons, and said general image display is mounted in said housing.

4. A video recorder according to claim 1 wherein the pressure-sensitive analog sensors are structured with resilient dome caps, said dome caps structured to provide tactile feedback.

5. A video recorder according to claim 1 wherein said first finger depressible surface and said second depressible surface are surfaces of a rocker.

6. A video recorder according to claim 5 wherein the pressure-sensitive analog sensors are structured with resilient dome caps, said dome caps structured to provide tactile feedback.

7. An improved video recorder of the type having capability for recording imagery, wherein the improvements comprise:
    a housing; and
    electronic circuitry located in said housing;
    a general image display mounted to said housing, said general image display operatively connected to said circuitry; a first depressible surface in part exposed on said housing, said first depressible surface operatively connected to
    a pressure-sensitive first analog sensor, said first analog sensor for inputting a first signal to said circuitry, said first signal having variable value depending on variable pressure applied to said first depressible surface;
    a second depressible surface in part exposed on said housing, said second depressible surface operatively connected to
    a pressure-sensitive second analog sensor, said second analog sensor for inputting a second signal to said circuitry, said second signal having variable value depending on variable pressure applied to said second depressible surface;
    said circuitry structured to receive the signals and to cause said general image display to zoom imagery at a variable rate according to variable pressure applied to the depressible surfaces.

8. An improved video recorder according to claim 7 wherein variable depression of a first depressible surface of a rocker having at least two depressible areas causes the imagery to scroll at a variable rate in a first direction on said display, and variable depression of a second depressible surface of said rocker causes the imagery to scroll at a variable rate in a second direction on said display.

9. An improved video recorder according to claim 7 wherein said first depressible surface and said second depressible surface are finger depressible single individual buttons.

10. An improved video recorder according to claim 9 wherein the pressure-sensitive analog sensors are structured to provide tactile feedback.

11. An improved video recorder according to claim 7 wherein the pressure-sensitive analog sensors are structured with resilient dome caps, said dome caps structured to provide tactile feedback.

12. An image recorder, comprising:

a housing;

electronic circuitry located in said housing;

a general image display mounted to said housing, said general image display operatively connected to said circuitry; at least one finger depressible surface in part exposed on said housing, said at least one finger depressible surface operatively connected to at least one depressible pressure-sensitive proportional sensor, said pressure-sensitive proportional sensor for inputting a signal to said circuitry, said signal having a varying value representing varying depression of said at least one finger depressible surface;

said circuitry structured to receive said signal and to cause said general image display to change display of viewable imagery at a rate related to said value.

13. An image recorder according to claim 12 wherein said at least one finger depressible surface is a first depressible surface, said image recorder further includes a finger depressible surface which is a second depressible surface in part exposed on said housing, said second depressible surface operatively connected to a second pressure-sensitive proportional sensor, said second pressure-sensitive proportional sensor for inputting a second signal to said circuitry, said second signal having a varying value representing varying depression of said second depressible surface.

14. An image recorder according to claim 13 wherein the pressure-sensitive proportional sensors are structured with resilient dome caps, said dome caps structured to provide a break-over tactile feedback.

15. An image recorder according to claim 14 wherein said first depressible surface and said second depressible surface are surfaces of at least a two-way rocker.

16. An image recorder according to claim 15 wherein depression of said first depressible surface causes the imagery to scroll in a first direction on said display, and depression of said second depressible surface causes the imagery to scroll in a second direction on said display.

17. An image recorder according to claim 14 wherein said first depressible surface and said second depressible surface are surfaces of a 4-way rocker.

18. An image recorder according to claim 13 wherein depression of said first depressible surface causes the imagery to zoom in a first direction on said display, and depression of said second depressible surface causes the imagery to zoom in a second direction on said display.

* * * * *